United States Patent Office 3,799,898
Patented Mar. 26, 1974

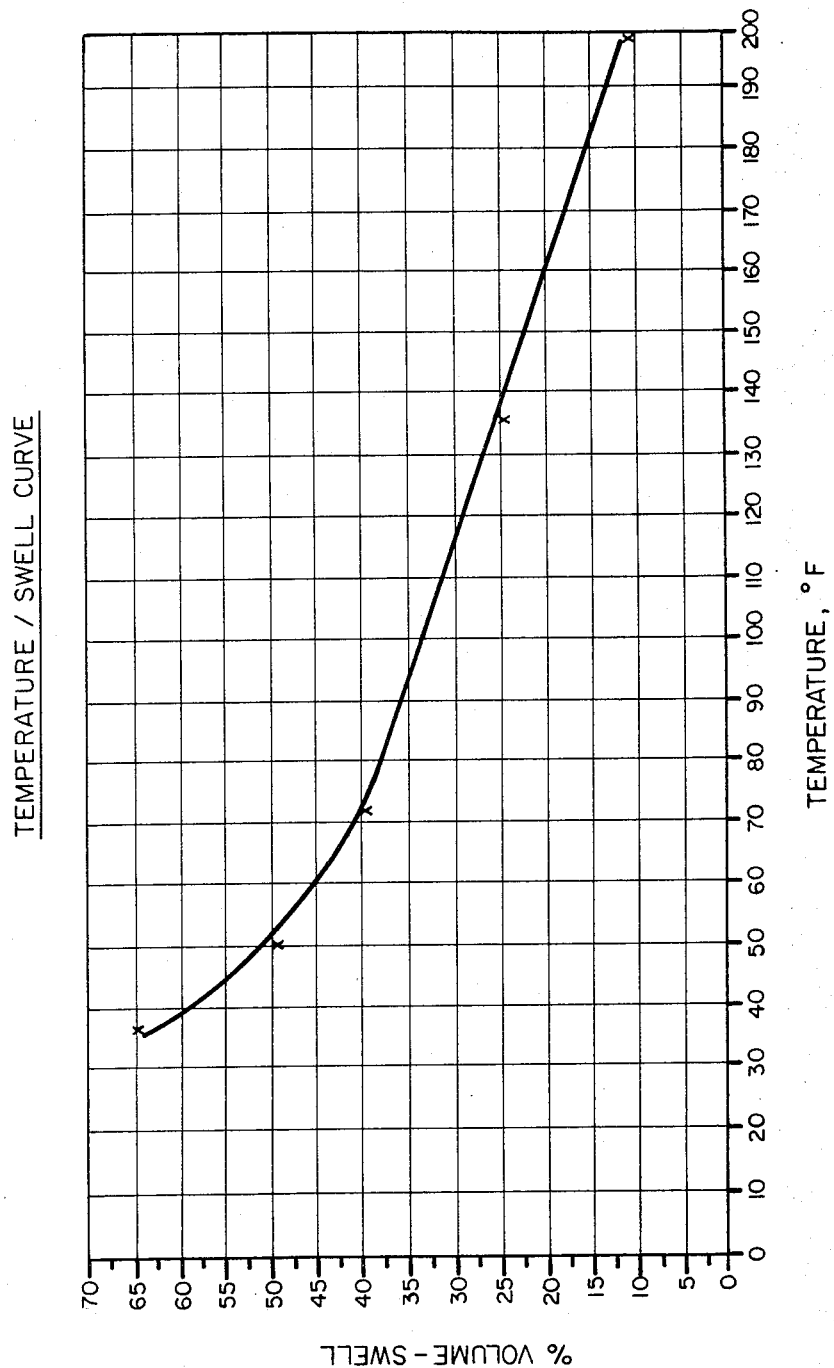

3,799,898
STABLE HYDROPHILIC POLYURETHANE FOAMS PREPARED BY USING A SURFACTANT SOLUBLE IN THE HYDROPHILIC POLYOL REACTANT
Roland J. Lamplugh, Chester, and Rocco P. Triolo, Broomall, Pa., assignors to Scott Paper Company, Philadelphia, Pa.
Continuation of abandoned application Ser. No. 806, Jan. 5, 1970. This application Oct. 16, 1972, Ser. No. 297,732
Int. Cl. C08g 22/44
U.S. Cl. 260—2.5 AD                                          7 Claims

ABSTRACT OF THE DISCLOSURE

Hydrophilic polyurethane foams which are flexible and stable, i.e., non-collapsible and non-shrinkable, non-disintegratable and characterized by improved "wet-out" and "percent volume-swell" properties, are produced from a foamable polyurethane-forming reaction mixture comprising (a) a hydrophilic polyol, (b) a foam-stabilizing amount of a surfactant which is soluble in said hydrophilic polyol and, if desired, (c) a foam-shrinkage inhibiting agent.

---

This is a continuation of application Ser. No. 806, filed Jan. 5, 1970, now abandoned.

BACKGROUND OF THE INVENTION

The invention relates to stable, i.e., non-collapsible and non-shrinkable, flexible cellular hydrophilic polyurethane foams and to a process for producing same. More particularly, this invention relates to the production of stable, reproducible hydrophilic polyurethane foams which do not shrink or collapse, and which are derived from a foamable polyurethane-forming reaction mixture comprising (a) a hydrophilic polyol, such as an oxyethylated propylene oxide polyol, (b) a foam-stabilizing amount of a surfactant, such as a silicone surfactant, which is soluble in said hydrophilic polyol and, if desired, (c) a foam-shrinkage inhibiting agent, such as a primary aromatic amine.

DESCRIPTION OF THE PRIOR ART

Polyurethane foams derived from both polyester and polyether polyols are generally hydrophobic in nature, i.e., they do not have an affinity for the absorption of water. The prior art has, however, disclosed certain modified polyether polyols suitable for use in foamable polyurethane-forming reaction mixtures to produce polyurethane foams characterized by hydrophilic properties. However, foamable polyurethane-forming reaction mixtures based on these modified polyether polyols suffer the disadvantage of being difficult to process and the foams produced therefrom are usually non-reproducible, i.e., the foams do not have substantially the same hydrophilic and mechanical properties and/or are unstable, i.e., the foam does not maintain its cellular integrity for any reasonable period of time and shrinks or collapses. Various grafting and impregnation methods have also been used in the prior art to produce hydrophilic sponge-like foam materials. For example, polymerizable hydrophilic monomers have been grafted onto hydrophobic polyurethane foam and hydrophilic polymers, such as polyacrolein have been used to impregnate polyurethane foams. Either a grafting step or an impregnation step would substantially increase the cost of the hydrophilic foam, and the foam obtained thereby is for the most part non-uniform and/or tends to lose its hydrophilicity. There is a long-felt need for stable, reproducible, hydrophilic polyurethane foam sponge suitable for surgical, household and industrial applications. Some of the prior art attempts at solving the problem of making a hydrophilic polyurethane foam have been directed to substituting non-ionic wax-like emulsifiers, such as nonylphenoxypoly-(ethylenoxy)ethanol for the more generally used silicone surfactants. Unfortunately, even the use of these, nonionic surfactants has not been able to overcome the problem of developing a stable, i.e., non-collapsible, non-shrinkable hydrophilic polyurethane foam. It is an unfortunate problem in the present stage of development of polyurethane technology that the challenge of developing a reproducible, i.e., foams having substantially the same hydrophilic and mechanical properties, stable, i.e., non-collapsible and non-shrinkable, hydrophilic polyurethane foam has not been met.

SUMMARY OF THE INVENTION

In accordance with this invention, stable, i.e., non-collapsible and non-shrinkable, reproducible, flexible, cellular hydrophilic polyurethane celliform structures are produced from foamable polyurethane-forming reaction mixtures comprising (a) a hydrophilic polyol, (b) a foam-stabilizing amount of a surfactant soluble in said hydrophilic polyol and, if desired, (c) a "foam-shrinkage inhibiting" amount of a primary aromatic amine. When an organic polyisocyanate is reacted with a hydrophilic polyol, defined more fully hereinbelow, and a surfactant which is soluble in said hydrophilic polyol and which is also defined more fully hereinbelow, the resulting polyurethane foam does not shrink or collapse, and is characterized by improved hydrophilic properties, such as superior "wet-out" and "percent water-swell" properties, said properties also being defined more fully hereinbelow.

BRIEF DESCRIPTION OF THE DRAWINGS

FIGS. 1 and 2 are temperature/percent swell curves of foams produced in accordance with the present invention.

DESCRIPTION OF THE PREFERRED EMBODIMENTS

Figure 1:
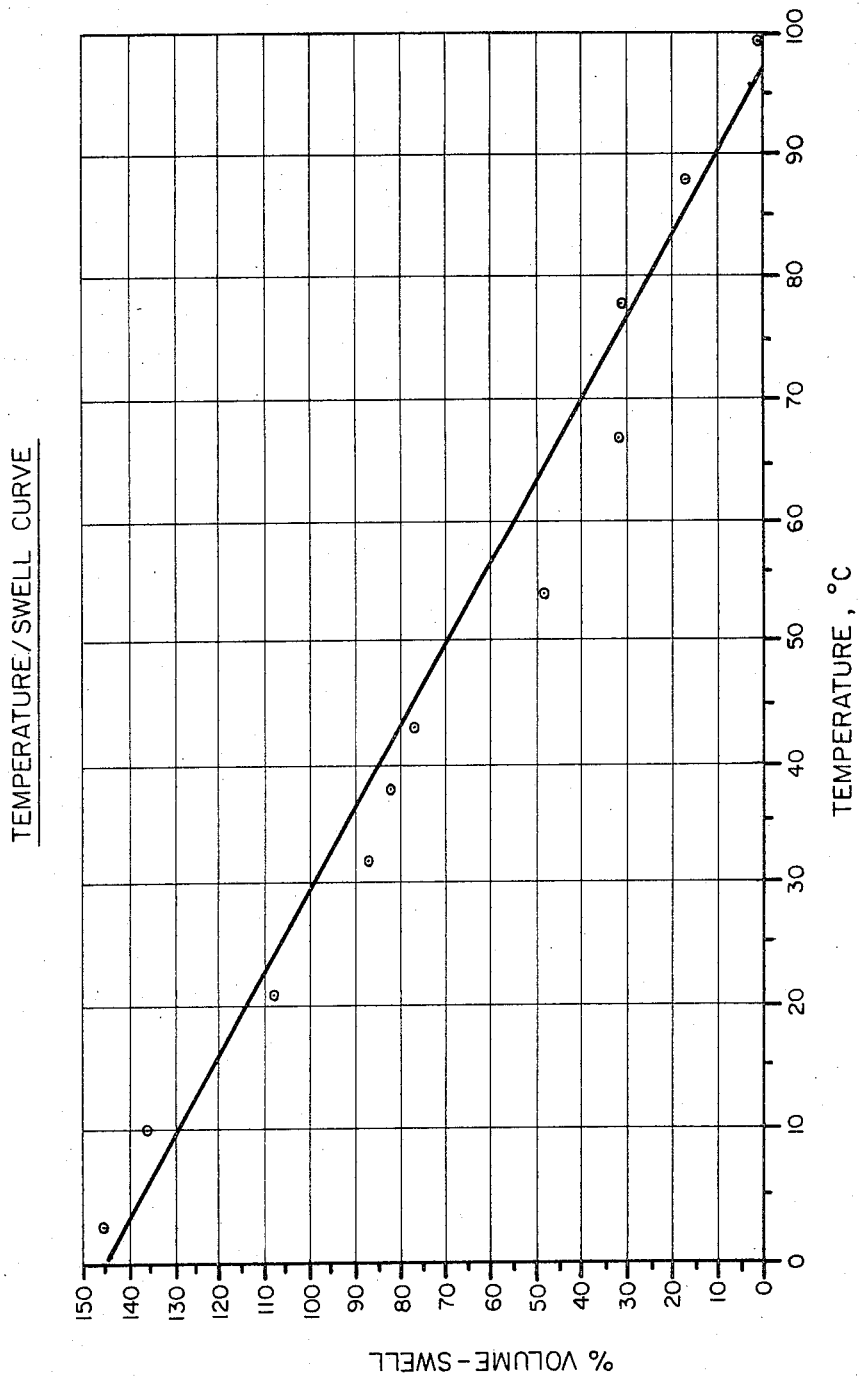

The amount of the above-mentioned soluble-surfactant contained in the foamable polyurethane-forming reaction mixture generally ranges from about 0.25 part to about 10 parts of surfactant, based on 100 parts by weight of hydrophilic polyol; the preferred range of soluble-surfactant is from about 0.5 part to about 5 parts by weight, based on 100 parts by weight of hydrophilic polyol. Generally foams derived from reaction mixtures containing less than 0.25 part by weight soluble surfactant tend to collapse. And foams derived from reaction mixtures containing more than 1.5 parts by weight soluble surfactant tend to shrink.

The hydrophilic foams of this invention are celliform structures which may be open-cell, closed-cell or reticulated. By a celliform structure is meant a structure in which at least the outlines of a 3-dimensional cellular structure are present. The cell walls may be present or they may be removed. Flexible polyurethane foams, conventionally, upon their production, are open-cell in character. That is to say, the individual dodecahedral cells of the foam body intercommunicate with each other and with the atmosphere, so that the final product has some degree of porosity; however, a significant number of cell walls are covered with membranes of the polyurethane polymer and offer significant impedance to flow therethrough. There are several post-cure techniques for removing the cell walls, such as by caustic hydrolysis of the cell membranes as disclosed in U.S. Pat. 3,171,820 issued to Volz, or by explosion degradation of the cell membrane as shown in U.S. Pat. 3,175,025 issued to Geen et al. The reticulated structures of this invention are characterized by improved mechanical properties, such as improved elongation and tensile and tear strengths. It has also been found that the reticulated structures of this invention are more adaptable for use as sponges than the non-reticulated structures even though the "wet-out" properties and the "percent water-swell" properties of the reticulated structures are no better than the corresponding properties of the non-reticulated structures. The hydrophilic properties of "wet-out" and "percent water-swell" will be defined more fully hereinbelow.

It has been discovered that the "wet-out" properties of the foam is improved at higher levels of surfactant concentration. If desired, a "shrinkage-inhibiting" agent may be used in combination with the soluble-surfactant. The use of a "shrinkage-inhibiting" agent is usually desired when the surfactant concentration exceeds about 1.5 parts by weight, based on 100 parts of polyol, because there is a tendency for the foam to shrink with increasing concentrations of surfactant. When from about 1 part to about 10 parts by weight of an aromatic primary amine, such as aniline, based on 100 parts by weight of polyol, is used in combination with the soluble surfactants of this invention, it functions as a "shrinkage-inhibiting" agent. It has been unexpectedly discovered that when aniline is used as a "shrinkage-inhibiting" agent in combination with the abovementioned soluble surfactants, it improves the foam's hydrophilic properties, such as "wet-out."

At present there is no standard test to measure the wet-out property of a hydrophilic foam. For purposes of this invention the wet-out property is defined as the time required for the absorption of one drop of water which has been gently placed on the surface of a foam sample of 4" x 4" x 2" dimensions. In the wet-out test, five drops of water are gently placed in a random pattern in five separate locations on the same test block of foam and the 5 water-absorption readings are averaged to determine the measure of wet-out. It should be noted that there is no forcing or initial impregnation of the foam by the water at the outset of the test.

In the percent water-swell test, a sample of foam is first cut to approximately 4" x 4" x 2" and then the actual dimensions of the test block of foam is precisely measured in centimeters, and the dry-volume is calculated and recorded. The test sample is then immersed in water which is maintained at 72° F. (22° C.) for 15 minutes. Since it has been discovered that volume-swell is dependent upon the temperature of the liquid, it is critical that the wet-volume be measured at a constant temperature. During the 15-minute test period, the foam is squeezed at random intervals to insure complete water wet-out, i.e., complete distribution of water throughout the test block of foam. The test sample is then measured for a second time to determine its wet-volume. The percent volume-swell (percent VS) is derived from the following equation:

(I)
$$\frac{\text{Final wet-volume} - \text{initial dry-volume}}{\text{Initial dry-volume}} \times 100 = \text{percent VS}$$

The soluble surfactants useful in this invention may be water-soluble and may also be silicone surfactants, but it is not essential that they be either water-soluble or silicones. It is necessary only that the surfactant be soluble in the hydrophilic polyol. In general the surfactants useful in this invention have a hydrophobic component and a hydrophilic component. The hydrophobic component of the surfactant may be derived from aliphatic alcohols, aliphatic mercaptans, aliphatic amines, fatty acids and alkyl phenols; depending upon the particular hydrophilic polyol used, the aliphatic alcohols, such as dodecyl, tetradecyl and cetyl alcohols and their corresponding mercaptans and amines are suitable as the hydrophobic component of the surfactant which is useful in this invention. In addition, phenols, such as octyl, dodecyl and nonyl, and isomers, and mixtures thereof are also suitable for use in this invention. The hydrophilic component of the surfactant may be derived from ethylene oxide provided that the surfactant is soluble in the hydrophilic polyol. The proportions of ethylene oxide used will depend upon the particular hydrophilic polyol. Representative soluble silicone surfactants useful in the practice of this invention are L–531, L–532 and L–5410 which are polyoxyalkylene-siloxane copolymers manufactured by Union Carbide; DC–193 and DC–195 which are silicone glycol copolymers manufactured by Dow Corning; and DC–1310 which is a polyoxyalkylene-siloxane copolymer manufactured by Dow Corning.

Representative soluble non-silicone organic surfactants useful in the practice of this invention are 77–86 which is a sulfated or sulfonated ethylene oxide-propylene oxide fatty acid adduct manufactured by Witco; M66–67 and M66–82 which are non-silicone organic surfactants manufactured by Witco; and EL–719 which is a polyoxyethylated vegetable oil manufactured by General Aniline and Film.

In addition to the novel-shrinkage inhibiting agents, such as aniline, mentioned hereinabove, various other additives may be incorporated in the polyurethane-forming composition along with the presently disclosed soluble-surfactants, such as fillers pigments, dyes, plasticizers and stabilizers.

The soluble-surfactant and foam-shrinkage inhibiting agent may be admixed with any one or more of the several components of the reactant composition involved in the making of the polyurethane material. For example, the components may be mixed and the reactant components polymerized in one place, or the soluble surfactant, and foam-shrinkage inhibiting agent may be mixed with one or more of the components, i.e., with the hydrophilic polyol, before mixture with the remaining components. The surfactant may be combined with the polyol, or the polyisocyanate, or catalyst reactants in any of several ways. Each of the polyol, polyisocyanate, catalyst and soluble-surfactant may be metered and pumped or charged into a common mixing vessel, and then the resulting mixture may easily be moved to the polymerization site for use in molds, slab stock operations, and the like. It is preferred to carry the soluble-surfactant alone, or in a water stream, or mixed with water and a catalyst. The soluble-surfactant may also be admixed with the polyol reactant before it is combined with the polyisocyanate reactant. It is also within the scope of the invention to mix the soluble-surfactant with the polyisocyanate before combining such mixture with the polyol reactant. However, if a catalyst, such as a tertiary amine, and the soluble-surfactant are mixed and allowed to stand at room temperature for substantial periods of time, reaction may occur. Hence, it is preferred to mix the polyol, polyisocyanate and/or catalyst and the soluble-surfactant either simultaneously, or to first mix the polyol and/or polyisocyanate with the soluble-surfactant and then combine this mixture with the catalyst. For example, it is sometimes advantageous to prepare a polyol-soluble-surfactant mix prior to combining all of the ingredients in making the novel polyurethane foam products of this invention.

For the most part the hydrophilic polyols used in this invention are hydrophilic polyether polyols. Representative hydrophilic polyols useful in this invention are various polyether polyols containing a plurality of poly(oxyethylene) groups, such as SA1421 manufactured by Dow Chemical Company, X601, X603 and X607 manufactured by Olin, and Pluracol 395 and 396, PR 7015, PR 7020 and PR 7048 manufactured by Wyandotte.

Organic polyisocyanates are reacted with the hydrophilic polyols described above to prepare polyurethanes. Broadly, the term "polyisocyanate" as used herein, means any of the prior art polyisocyanates that have been or could be used to prepare polyurethanes. The term includes monomeric di- and polyisocyanates and prepolymers of polyols and polyisocyanates where the isocyanate groups are in excess so that there are free available isocyanate groups available to react with additional polyol. The organic polyisocyanates useful for the production of the polyurethanes include ethylene diisocyanate, ethylidene diisocyanate, propylene-1,2-diisocyanate, butylene-1,3-diisocyanate, hexylene - 1,6 - diisocyanate, cyclohexylene-1,2-diisocyanate, and the aromatic polyisocyanates having from 2 to 3 isocyanate groups per molecule and from 1 to 3 phenylene rings as the only aromatic cyclic ring systems, such as m-phenylene diisocyanate, 2,4-toluene diisocyanate, 2,6-toluene diisocyanate, 3,3'-dimethyl- as well as various other polyisocyanates such as 4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
triphenylmethane triisocyanate,
1,5-naphthalene diisocyanate, and the like.

Useful catalyst or initiator materials which may be used as the "catalyst" component include the tertiary amines, either individually or in mixture like N-alkylmorpholines, such as N-ethylmorpholine, and N,N-dialkylcyclohexylamines, where the alkyl groups are methyl, ethyl, propyl, butyl, etc., also triethylamine, tripropylamine, tributylamine, triamylamine, pyridine, quinoline, dimethylpiperidine, dimethylhexahydroaniline, diethylhexahydroaniline, the reaction products of N,N'-diethylaminoethanol and phenyl isocyanate, esterimides, 1-methyl-4-(dimethylaminoethyl)piperazine, N - ethylethylenimine, N,N,N',N'-tetramethyl-1,3-butanediamine, triethylamine, 2,4,6-tri(dimethylaminomethyl)phenol, tetramethylguanidine, 2-methylpyrazine, dimethylaniline, and nicotine; and metallic compounds including those of bismuth, lead, tin, titanium, iron antimony, uranium, cadmium, cobalt, thorium, aluminum, mercury, zinc, nickel, cerium, molybdenum, vanadium, copper, manganese, zirconium, etc., examples of which include bismuth nitrate, lead 2-ethylhexoate, lead benzoate, lead oleate, sodium trichlorophenate, sodium propionate, lithium acetate, potassium oleate, tetrabutyl tin, butyl tin trichlorate, stannic chloride, tributyl tin 1-nonylphenate, stannous octoate, stannous oleate, dibutyl tin di(2-ethylhexoate), di(2-ethylhexyl)tin oxide, titanium tetrachloride, tetrabutyl titanate, ferric chloride, antimony trichloride, cadmium diethyl dithiophosphate, thorium nitrate, triphenylaluminum, nickelocene, etc. The catalyst component either as single compound or as a mixture may be used in conventional amounts, which usually range from about 0.05 to about 4 parts of catalyst per 100 parts of polyolisocyanate reactants by weight.

In the art and technology of producing polyurethanes, it is also known to employ what is called prepolymer techniques. This is a technique wherein part of the reaction involved in making a polyurethane is carried out yielding a prepolymer of increased molecular weight and with either resultant end groups of hydroxyls or isocyanates depending upon the stoichiometry used in making this prepolymer. This prepolymer is then used to prepare the desired final polyurethane product by reacting it with either a polyisocyanate or one of the desired polyols, depending, as has been mentioned above, on whether the terminal groups of the prepolymer are hydroxyls or isocyanates, respectively. The soluble-surfactant of this invention may also be used in the prepolymer technique of producing polyurethanes.

Polyurethanes are used in both the unfoamed and the so-called "foam" form. In general, a foamed polyurethane is formed when low boiling liquids, or normally gaseous blowing agents, or inflatants are generated by or incorporated into the polyurethane-forming reactants. Often the heat of reaction causes these low boiling liquid or gaseous blowing agents to volatilize, thus foaming the composition. In some cases the boiling point of the blowing agent is chosen to be well below room temperature, and the composition can be made to foam even before any substantial reaction between the polyol and the polyisocyanate reactants has occurred or before any heat is evolved. This technique is sometimes called frothing. Useful blowing agents, i.e., foam-inducing agents, which may be added when foams are desired include water, either alone or admixed with other components, e.g., as an aqueous solution of a tertiary amine catalyst, and the chlorinated and fluorinated alkanes having from 1 to about 2 carbon atoms, such as the chlorofluoromethanes and chlorofluoroethanes, which are commercially available under various trademarks, such as "Freon" manufactured by E. I. du Pont.

The stable hydrophilic foams of this invention are suitable for use in various applications, uch a houeholdrr,pO sponges, surgical sponges, feminine personal products, components of paper and non-woven laminates, scrubbing devices, disposable cleaning and wiping devices, disposable diapers, rollers for water-base paint, cartridges for absorption of urine, applicators for deodorants and cosmetics, humidifier elements, and the like.

EXAMPLES

To assist those skilled in the art to practice the present invention, the following procedures are suggested by way of illustration, parts and percentages being by weight unless otherwise specifically noted.

The compositions of the foamable polyurethane-forming reaction mixtures used in the illustrative examples are recited in tabular form. The ingredients of the reaction mixtures are recited in parts per hundred relative to 100 parts by weight of polyol resin. In the tables, the ingredients are identified by their trademarks or a representative symbol. The polyisocyanate in the reaction mixture is identified as "Hylene TM," an 80:20 mixture of the 2,4- and 2,6-isomers of toluene diisocyanate. The ratio of the actual amount of polyisocyanate in the reaction mixture to the theoretical amount of polyisocyanate needed for reaction with all active hydrogen compounds present in the reaction mixture multiplied by 100 is expressed in the tables as "Index." The expression "NEM" represents N-ethylmorpholine. The expression "X607" is a polyether polyol containing oxyalkylene substituents vended by Olin Corporation. The expressions "L-531," "L-532" and "L-5410" represent polyoxyalkylene-siloxane copolymers vended by Union Carbide Corporation. The expressions "DC-193" and "DC-195" represent silicone glycol copolymers vended by Dow Corning. The expression "DC-1310" represents a polyoxyalkylenesiloxane copolymer vended by Dow Corning. The expression "77-86" represents a sulfated or sulfonated ethylene oxide-propylene oxide fatty acid adduct vended by Witco Chemical Company. The expression "EL-719" represents a polyoxyethylated vegetable oil vended by General Aniline & Film. The expressions "M66-67" and "M66-82" represent non-silicone organic surfactants vended by Witco Chemical Company. The expression "C-6" represents a solution containing one part by weight stannous octoate and two parts by weight dioctylphthalate vended by Witco Chemical Company. The expression "SA1421" represents a polyether polyol containing poly(oxyethylene)groups vended by Dow Chemical Company. The expressions "Pluracol 395" and "Pluracol 396," "PR 7015" and "PR 7048" represent polyether polyols containing poly(oxyethylene) groups in varying amounts vended by Wyandotte Chemical Company. The expression "PR 7020" represents an amine initiated polyether polyol containing poly(oxyethylene)groups vended by Wyandotte Chemical Company.

TABLE I.—FOAM COMPOSITION

| Ingredients | A | B | C | D | E | F | G |
|---|---|---|---|---|---|---|---|
| SA1421 | 100 | 100 | 100 | 100 | | | |
| Pluracol 395 | | | | | 80 | 80 | |
| Pluracol 396 | | | | | 20 | 20 | |
| Olin X-607 | | | | | | | 100 |
| C-6 | 0.6 | 0.6 | 0.6 | 0.6 | 1.2 | 1.2 | 1.2 |
| NEM | 0.1 | 0.1 | 0.1 | 0.1 | 0.1 | 0.1 | 0.1 |
| H₂O | 3.0 | 3.0 | 3.0 | 3.0 | 3.0 | 3.0 | 3.0 |
| Hylene TM | 31.6 | 31.6 | 31.6 | 31.6 | 34.2 | 34.2 | 32.5 |
| Index | 90 | 90 | 90 | 90 | 90 | 90 | 90 |
| Surfactant: | | | | | | | |
| L-532 [1] | 3.0 | | | | 3.0 | | 3.0 |
| M66-82 [2] | | 3.0 | | | | 3.0 | |
| L-540 [3] | | | 3.0 | | | | |
| R-150 [4] | | | | 3.0 | | | |

[1] Silicone surfactant (soluble in hydrophilic polyol).
[2] Non-silicone surfactant (soluble in hydrophilic polyol).
[3] Silicone surfactant (insoluble in hydrophilic polyol).
[4] Non-silicone surfactant (insoluble in hydrophilic polyol).

Significance.—All of the polyurethane foams obtained from the compositions described in Table I using either soluble silicone or soluble non-silicone surfactants were stable, i.e., non-shrinkable and non-collapsible, and hydrophilic, whereas, those polyurethane foams obtained from the compositions using either insoluble silicone (foam C) or insoluble non-silicone (foam D) surfactants were unstable, i.e., they collapsed. The results of the stability and hydrophilicity tests are given in Table II. In Table II, test foam A corresponds with test foam A of Table I, etc.

TABLE II

| Foam properties | A | B | C | D | E | F | G |
|---|---|---|---|---|---|---|---|
| Stable | X | X | | | X | X | X |
| Collapses | | | X | X | | | |
| Wet-out, secs | 8 | 22 | | | 36 | 40 | 22 |
| Volume-swell, percent | 102 | 107 | | | 108 | 96 | 75 |

The following Table III gives additional foam compositions useful in the practice of this invention.

TABLE III.—FOAM COMPOSITION

| Ingredients | H | I | J | K | L | M | N | O | P | Q | R | S |
|---|---|---|---|---|---|---|---|---|---|---|---|---|
| SA1421 | 100 | 100 | 100 | 100 | 100 | 100 | 100 | 100 | | | | |
| Pluracol 395 | | | | | | | | | 80 | 80 | | |
| Pluracol 396 | | | | | | | | | 20 | 20 | | |
| Olin X-607 | | | | | | | | | | | 100 | 100 |
| C-6 | .60 | .30 | .60 | 1.2 | .90 | .15 | .60 | .60 | 1.2 | 1.2 | 1.2 | 1.2 |
| NEM | .10 | .10 | .10 | .10 | .10 | .10 | .10 | .10 | .10 | .10 | .10 | .10 |
| H₂O | 3.0 | 3.0 | 3.0 | 3.0 | 3.0 | 3.0 | 3.0 | 3.0 | 3.0 | 3.0 | 3.0 | 3.0 |
| Hylene TM | 31.6 | 31.6 | 31.6 | 31.6 | 31.6 | 31.6 | 31.6 | 31.6 | 34.2 | 34.2 | 32.5 | 32.5 |
| Index | 90 | 90 | 90 | 90 | 90 | 90 | 90 | 90 | 90 | 90 | 90 | 90 |
| Surfactant: | | | | | | | | | | | | |
| L-531 | 3.0 | | | | | | | | 3.0 | | 3.0 | |
| DC-193 | | 3.0 | | | | | | | | 3.0 | | 3.0 |
| DC-195 | | | 3.0 | | | | | | | | | |
| 77-86 | | | | 3.0 | | | | | | | | |
| M66-67 | | | | | 3.0 | | | | | | | |
| L-5410 | | | | | | 3.0 | | | | | | |
| DC-1310 | | | | | | | 3.0 | | | | | |
| EL-719 | | | | | | | | 3.0 | | | | |

Significance.—In Table III all of the listed surfactants were soluble in the hydrophilic polyol. All of the polyurethane foams obtained from the compositions described in Table III were stable, i.e., non-shrinkable and non-collapsible, and hydrophilic. Hydrophilic properties, especially wet-out times, varied according to the particular soluble surfactant used in the composition. In Table IV, test foam A corresponds with test foam A of Table III, etc. Table IV describes the hydrophilic properties (wet-out and percent volume-swell) of the foams produced from the compositions of Table III.

The following Table V gives foam compositions which illustrate the prior art problem relating to foam instability.

TABLE V.—FOAM COMPOSITION

| | T | U | V | W | X | Y |
|---|---|---|---|---|---|---|
| SA1421 | 100 | 100 | 100 | 100 | 100 | 100 |
| C-6 | 0.6 | 0.6 | 0.6 | 0.6 | 0.6 | 0.6 |
| NEM | 0.5 | 0.5 | 0.5 | 0.5 | 0.5 | 0.5 |
| H₂O | 3.0 | 3.0 | 3.0 | 3.0 | 3.0 | 3.0 |
| Hylene TM | 31.6 | 31.6 | 31.6 | 31.6 | 31.6 | 31.6 |
| Index | 90 | 90 | 90 | 90 | 90 | 90 |
| Surfactant: | | | | | | |
| L-520 | 1.0 | | | | | |
| L-530 | | 1.0 | | | | |
| L-5340 | | | 1.0 | | | |
| Y-4499 | | | | 1.0 | | |
| DC-202 | | | | | 1.0 | |
| SF-1066 | | | | | | 1.0 |

Significance.—All of the surfactants evaluated in the compositions described in Table V were insoluble in hydrophilic polyol SA1421. All of the polyurethane foams obtained from the compositions described in Table V were unstable, i.e., they collapsed.

The following Tables VI and VII give the relationship between the concentration of hydrophilic polyol in the foam composition and the hydrophilic properties of wet-out and percent volume-swell of the foam produced from said composition.

TABLE VI.—FOAM COMPOSITION

| | A' | B' | C' | D' | E' | F' | G' |
|---|---|---|---|---|---|---|---|
| SA1421 | 100 | 50 | 40 | 35 | 30 | 25 | |
| Fomrez-50 | | 50 | 60 | 65 | 70 | 75 | 100 |
| NEM | 0.1 | 0.5 | 2.0 | 2.0 | 2.0 | 2.0 | 2.5 |
| C-6 | 0.6 | 0.75 | | | | | |
| H₂O | 3.0 | 3.0 | 3.0 | 3.0 | 3.0 | 3.0 | 3.0 |
| Hylene TM | 35.6 | 37.0 | 37.3 | 37.5 | 37.6 | 37.0 | 38.7 |
| Index | 100 | 100 | 100 | 100 | 100 | 100 | 100 |
| Surfactant: | | | | | | | |
| L-531 | 0.6 | | | | | | |
| L-532 | | 3.0 | | | | | 1.0 |
| DC-1310 | | | 3.0 | 3.0 | 3.0 | 3.0 | |

Significance.—The polyurethane foams obtained from the compositions of Table VI were all stable, i.e., non-shrinkable and non-collapsible, and exhibited percent volume-swells proportional to the weight percent hydrophilic polyol contained in the composition. In Table VII, test foam A' corresponds to test foam A' in Table VI, etc. Table VII describes the hydrophilic properties of the foams produced from the compositions of Table VI.

TABLE VII

| Properties | A' | B' | C' | D' | E' | F' | G' |
|---|---|---|---|---|---|---|---|
| Wet-out, secs | 5 | 18 | 55 | 61 | 120 | >180 | >180 |
| Percent volume-swell | 91 | 40 | 36 | 26 | 23 | 14 | 0 |

TABLE IV

| Properties | H | I | J | K | L | M | N | O | P | Q | R | S |
|---|---|---|---|---|---|---|---|---|---|---|---|---|
| Density, p.c.f | 2.3 | 2.5 | 2.1 | 2.1 | 2.4 | 2.5 | 2.6 | 2.2 | 2.2 | 2.2 | 2.1 | 2.1 |
| Wet-out, secs | 3 | >180 | >180 | 47 | >180 | >180 | 87 | >180 | 2 | >180 | 3 | >180 |
| Percent volume-swell | 100 | 97 | 111 | 109 | 112 | 105 | 108 | 104 | 111 | 94 | 74 | 66 |

The following Tables VIII and IX give the relationship between the concentration of soluble surfactant in the foam composition and the hydrophilic properties of wet-out and percent volume-swell of the foam produced from said composition.

TABLE VIII.—FOAM COMPOSITION

|  | H' | I' | J' | K' |
|---|---|---|---|---|
| SA1421 | 100 | 100 | 50 | 50 |
| Fomrez-50 |  |  | 50 | 50 |
| NEM | 0.1 | 0.1 | 0.1 | 0.1 |
| C-6 | 0.6 | 0.6 | 0.75 | 0.75 |
| $H_2O$ | 4.0 | 4.0 | 3.0 | 3.0 |
| Hylene TM | 40.4 | 40.4 | 38.1 | 38.0 |
| Index | 90 | 90 | 100 | 100 |
| Surfactant: L-532 | 0.6 | 1.5 | 1.0 | 3.0 |

Significance.—All of the polyurethane foams obtained from the compositions described in Table VIII were stable, i.e. non-shrinkable and non-collapsible, and hydrophilic. Hydrophilic properties, especially wet-out times, varied according to the surfactant concentration; the higher the soluble surfactant concentration, the more rapid was the wet-out of the foam. In Table IX, test foam H' corresponds to test foam H' of Table VIII, etc. Table IX describes the hydrophilic properties (wet-out and percent volume-swell) of the foams produced from the compositions of Table VIII.

TABLE IX

| Properties | H' | I' | J' | K' |
|---|---|---|---|---|
| Wet-out (secs.) | 59 | 13 | 51 | 9 |
| Percent volume-swell | 99 | 99 | 41 | 40 |

The following Tables X and XI show the unexpected advantages obtained when a primary aromatic amine, such as aniline, is added to the foam composition.

TABLE X.—FOAM COMPOSITION

|  | L' | M' | N' | O' |
|---|---|---|---|---|
| SA1421 | 100 | 100 | 50 | 50 |
| Fomrez-50 |  |  | 50 | 50 |
| NEM | 1.0 | .05 | 0.1 | 0.1 |
| C-6 | 1.2 | 0.75 | 0.5 | 0.5 |
| Aniline |  | 3.0 |  | 1.0 |
| $H_2O$ | 3.0 | 3.25 | 3.0 | 3.0 |
| Hylene TM | 35.6 | 40.9 | 37.2 | 38.1 |
| Index | 100 | 100 | 100 | 100 |
| Surfactant: L-532 | 1.0 | 1.0 | 1.0 | 1.0 |

Significance.—All of the polyurethane foams obtained from the compositions described in Table X were stable, i.e., non-shrinkable and non-collapsible, and hydrophilic. Hydrophilic properties, especially wet-out times were favorably influenced by the incorporation of aniline in the foam composition. The compositions containing aniline exhibited faster wet-out times than the compositions which did not contain aniline. In Table XI, test foam L' corresponds to test foam L' of Table X, etc. Table XI describes the hydrophilic properties (wet-out and percent volume-swell) of the foams produced from the compositions of Table X.

TABLE XI

| Properties | L' | M' | N' | O' |
|---|---|---|---|---|
| Wet-out (secs.) | 150 | 7 | 101 | 51 |
| Percent volume swell | 100 | 93 | 42 | 41 |

The following Tables XII to XIII and FIGS. 1 and 2 give the relationship between the percent volume-swell of foams produced in accordance with this invention and the temperature of the solvent, water, used as the test medium.

TABLE XII.—FOAM COMPOSITION

|  | A'' | B'' |
|---|---|---|
| SA1421 | 90 | 50 |
| LHT-112 | 10 |  |
| Fomrez-50 |  | 50 |
| NEM | 0.10 | 0.10 |
| C-6 | 0.75 | 1.0 |
| $H_2O$ | 3.5 | 3.0 |
| Hylene TM | 39.3 | 38.1 |
| Index | 90 | 100 |
| Surfactant: L-532 | 3.0 | 3.0 |

Significance.—The two polyurethane foams obtained from the compositions described in Table XII were stable, i.e., non-shrinkable and non-collapsible, and hydrophilic. An unexpected relationship was discovered when percent volume-swell was studied as a function of solvent ($H_2O$) temperature. The percent volume-swell was found to be inversely proportional to solvent ($H_2O$) temperature, i.e., as the temperature of the $H_2O$ is decreased, the percent volume-swell is increased. Table XIII describes the relationship between percent volume-swell and solvent ($H_2O$) temperature of the two foams produced from the compositions of Table XII. This relationship is further described in terms of temperature/percent-swell curves (T/S) which are recorded in graphical form in FIGS. 1 and 2, which show the T/S curve for foams A'' and B'' respectively of Table XII.

TABLE XIII.—PERCENT VOLUME-SWELL DATA

| Temperature (° F.) | A'' (percent volume-swell) | B'' (percent volume-swell) |
|---|---|---|
| 212 | 13 |  |
| 200 |  | 10 |
| 190 | 18 |  |
| 170 | 30 |  |
| 150 | 31 |  |
| 135 |  | 23 |
| 130 | 44 |  |
| 110 | 78 |  |
| 100 | 83 |  |
| 90 | 86 |  |
| 72 |  | 39 |
| 70 | 105 |  |
| 50 | 135 | 49 |
| 35 | 145 | 64 |

It is to be understood that changes and variations may be made without departing from the spirit and scope of this invention as defined by the appended claims.

What is claimed is:

1. A method for producing a flexible, stable hydrophilic polyurethane foam comprising reacting a polyurethane-forming composition comprising (a) a hydrophilic polyether polyol, (b) an organic polyisocyanate, (c) from about 0.25 part to about 10 parts by weight, based on 100 parts by weight of the hydrophilic polyol of a surfactant soluble in said hydrophilic polyol, (d) a reaction catalyst and (e) a foaming agent.

2. A method as defined in claim 1 wherein the soluble surfactant is a silicone surfactant.

3. A method as defined in claim 1 comprising incorporating in the polyurethane-forming composition from about 1 part to about 10 parts by weight, based on 100 parts by weight of the hydrophilic polyol of aniline.

4. A flexible, stable, hydrophilic polyurethane celliform structure prepared by the method claimed in claim 1.

5. A polyurethane celliform structure, as claimed in claim 4, further characterized by a uniform water-swell response which is inversely proportional to incrementally increasing water temperatures.

6. A polyurethane celliform structure, as claimed in claim 4, which is 3-dimensionally reticulated.

7. A composition, which, when used in combination with an organic polyisocyanate, a reaction catalyst and a foaming agent, is useful in the preparation of a flexible, stable, hydrophilic polyurethane celliform structure, comprising a hydrophilic polyether polyol, from about 0.25 part to about 10 parts by weight based on 100 parts by weight of the hydrophilic polyol of a surfactant soluble in said polyol, and from about 1 part to about 10 parts by weight of aniline, based on 100 parts by weight of the hydrophilic polyol.

References Cited
UNITED STATES PATENTS

| | | | |
|---|---|---|---|
| 2,977,330 | 3/1961 | Brower | 260—2.5 |
| 3,507,815 | 4/1970 | Bailey et al. | 260—2.5 |
| 3,285,866 | 11/1966 | Gmitter | 260—2.5 |
| 2,965,584 | 12/1960 | Elkin | 260—2.5 |
| 3,457,203 | 7/1969 | Cohen et al. | 260—2.5 |
| 3,249,465 | 5/1966 | Chen | 260—2.5 |
| 3,425,999 | 2/1969 | Axelrood | 260—2.5 |
| 3,336,242 | 8/1967 | Hampson et al. | 260—2.5 |

FOREIGN PATENTS

| | | | |
|---|---|---|---|
| 825,896 | 8/1967 | Great Britain | 260—2.5 |

DONALD E. CZAJA Primary Examiner

E. C. RZUCIDLO, Assistant Examiner

U.S. Cl. X.R.

260—2.5 AG, 2.5 AH, 2.5 AP

PO-1050
(5/69)

UNITED STATES PATENT OFFICE
CERTIFICATE OF CORRECTION

Patent No. 3,799,898           Dated   March 26, 1974

Inventor(s)  Lamplugh/Triolo

It is certified that error appears in the above-identified patent and that said Letters Patent are hereby corrected as shown below:

Column 2, line 4, "(ethylenoxy) should be --(ethyleneoxy)--

Column 5, line 65, "stoichiometry" should be --stoichoimetry--

Column 6, line 22, "uch a houeholdrr,p0" should be --such as household-- line 42, "mixture" should be --mixtures--

Column 7, Table II, "22" second occurrence, should be --25--

"75" should be --72--

Column 9, Table VIII, "38.0" should be --38.1--

Signed and sealed this 28th day of January 1975.

(SEAL)
Attest:

McCOY M. GIBSON JR.
Attesting Officer

C. MARSHALL DANN
Commissioner of Patents